(12) United States Patent
Meng et al.

(10) Patent No.: US 11,647,176 B2
(45) Date of Patent: May 9, 2023

(54) METHODS AND SYSTEMS FOR CAMERA CALIBRATION

(71) Applicant: ZHEJIANG DAHUA TECHNOLOGY CO., LTD., Zhejiang (CN)

(72) Inventors: Chengzhe Meng, Hangzhou (CN); Huadong Pan, Hangzhou (CN); Mei Gao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/304,744

(22) Filed: Jun. 25, 2021

(65) Prior Publication Data

US 2021/0321078 A1  Oct. 14, 2021

Related U.S. Application Data

(63) Continuation of application No. PCT/CN2018/125766, filed on Dec. 29, 2018.

(51) Int. Cl.
*H04N 13/246* (2018.01)
*H04N 13/204* (2018.01)
(Continued)

(52) U.S. Cl.
CPC ............. *H04N 13/246* (2018.05); *G06T 7/85* (2017.01); *H04N 13/221* (2018.05)

(58) Field of Classification Search
CPC ............. G06T 7/85; G06T 2207/30232; G06T 2207/30244; G06T 7/73; H04N 13/221; H04N 13/246
(Continued)

(56) References Cited

U.S. PATENT DOCUMENTS 9,374,529 B1 * 6/2016 Kozko ................ H04N 5/2258
2003/0031359 A1 2/2003 Miki et al.
(Continued)

FOREIGN PATENT DOCUMENTS

CN 101853521 A 10/2010
CN 103810746 A 5/2014
(Continued)

OTHER PUBLICATIONS

International Search Report in PCT/CN2018/125766 dated Sep. 27, 2019, 4 pages.
(Continued)

*Primary Examiner* — Susan E. Torgerson
(74) *Attorney, Agent, or Firm* — Metis IP LLC

(57) ABSTRACT

An image capture method may include obtaining two or more sets of images. The two or more sets of images may include a first image captured by a first image capture device and a second image captured by a second image capture device. The method may also include determining, for a set of images, two or more pairs of points. Each of the two or more pairs of points may include a first point in the first image and a second point in the second image, and the first point and the second point may correspond to a same object. The method may also include determining a first rotation matrix based on the pairs of points in the two or more sets of images. The first rotation matrix may be associated with a relationship between positions of the first image capture device and the second image capture device.

18 Claims, 6 Drawing Sheets

(51) Int. Cl.
*G06T 7/80* (2017.01)
*H04N 13/221* (2018.01)

(58) Field of Classification Search
USPC .......................................................... 348/47
See application file for complete search history.

(56) References Cited

U.S. PATENT DOCUMENTS

| | | | |
|---|---|---|---|
| 2007/0236570 A1 | 10/2007 | Sun et al. | |
| 2008/0144925 A1* | 6/2008 | Zhu .................. | G06T 7/593 382/154 |
| 2011/0234759 A1* | 9/2011 | Yamaya .................. | G06T 17/00 348/46 |
| 2012/0169882 A1 | 7/2012 | Millar et al. | |
| 2014/0355820 A1 | 12/2014 | Wu et al. | |
| 2015/0181199 A1 | 6/2015 | Yu et al. | |
| 2019/0121216 A1* | 4/2019 | Shabtay ............... | G02B 26/105 |

FOREIGN PATENT DOCUMENTS

| | | |
|---|---|---|
| CN | 104574425 B | 5/2016 |
| CN | 106530358 A | 3/2017 |
| CN | 106612397 A | 5/2017 |
| CN | 104537659 B | 10/2017 |
| CN | 107707899 A | 2/2018 |
| CN | 109005334 A | 12/2018 |

OTHER PUBLICATIONS

Written Opinion in PCT/CN2018/125766 dated Sep. 27, 2019, 3 pages.
Chih-Wei Lin et al., Large-Area, Multilayered, and High-Resolution Visual Monitoring Using a Dual-Camera System, ACM Transactions on Multimedia Computing Communications and Applications, 11(2): 30:1-30:23, 2014.
Richard Szeliski, Image Alignment and Stitching: A Tutorial, Foundations and Trends in Computer Graphics and Vision, 2006, 105 pages.
The Extended European Search Report in European Application No. 16944145.4 dated Nov. 12, 2021, 7 pages.

* cited by examiner

500

| |
|---|
| Obtaining one or more sets of images, wherein the one or more sets of images includes a first image captured by a first image capture device and a second image captured by a second image capture device — 510 |

↓

| |
|---|
| For a set of images, determining one or more pairs of points, wherein each of the one or more pairs of points includes a first point in the first image and a second point in the second image, and the first point and the second point correspond to a same object — 520 |

↓

| |
|---|
| Determining a first rotation matrix based on the pairs of points in the one or more sets of images, wherein the first rotation matrix is associated with a relationship between positions of the first image capture device and the second image capture device — 530 |

FIG. 5

METHODS AND SYSTEMS FOR CAMERA CALIBRATION

CROSS-REFERENCE TO RELATED APPLICATIONS

This application is a Continuation of International Application No. PCT/CN2018/125766, filed on Dec. 29, 2018, the entire contents of which are hereby incorporated by reference.

TECHNICAL FIELD

The present disclosure generally relates to computer vision, and more specifically relates to methods and systems for camera calibration.

BACKGROUND

It is desirous for surveillance systems to monitor a wide area, as well as capture detailed information about any specific target within that wide area. Therefore, a side-by-side combination of cameras, such as a wide-angle camera mounted next to a pan-tilt-zoom (PTZ) camera, is used in the surveillance systems. Before the surveillance systems detect a moving object and take a picture of the moving object, calibration between the two cameras is required. It is desirable to provide systems and methods for automatic and efficient camera calibration between two cameras.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, an image capture system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain two or more sets of images. The two or more sets of images may include a first image captured by a first image capture device and a second image captured by a second image capture device. The one or more processors may determine, for a set of images, two or more pairs of points. Each of the two or more pairs of points may include a first point in the first image and a second point in the second image, and the first point and the second point may correspond to a same object. The one or more processors may determine a first rotation matrix based on the pairs of points in the two or more sets of images. The first rotation matrix may be associated with a relationship between positions of the first image capture device and the second image capture device.

In some embodiments, the first image may be captured from a first field of view of the first image capture device, the second image may be captured from a second field of view of the second image capture device, and there may be overlap between the first field of view and the second field of view.

In some embodiments, the second fields of view related to the second images in the two or more sets of images may completely cover the first field of view.

In some embodiments, the first image capture device may have a broad field of view that is greater than a threshold, and the second image capture device may be a pan-tilt-zoom (PTZ) camera.

In some embodiments, to determine the first rotation matrix based on the pairs of points in the two or more sets of images, the one or more processors may determine, for each pair of points, first three-dimensional (3D) information related to the first point based on a first 3D coordinate system associated with the first image capture device. The one or more processors may determine second 3D information related to the second point based on a second 3D coordinate system associated with the second image capture device. The one or more processors may determine the first rotation matrix based on the first 3D information and the second 3D information.

In some embodiments, the first 3D information related to the first point may include 3D coordinates of the first point or a vector from an optical center of the first image capture device to the first point, and the second 3D information related to the second point may include 3D coordinates of the second point or a vector from an optical center of the second image capture device to the second point.

In some embodiments, to determine the first rotation matrix based on the first 3D information and the second 3D information, for each second image in the two or more sets of images, the one or more processors may obtain a pan parameter and a tilt parameter of the second image capture device that are used to capture the second image. The one or more processors may determine a second rotation matrix based on the pan parameter and the tilt parameter. The second rotation matrix may be associated with a relationship between the second 3D coordinate system associated with the second image capture device and a world coordinate system. The one or more processors may determine the first rotation matrix based on the second rotation matrix related to the each second image, the first 3D information, and second 3D information.

In some embodiments, the first rotation matrix may be determined using a Levenberg-Marquardt (LM) algorithm.

According to another aspect of the present disclosure, an image capture method may include one or more of the following operations. One or more processors may obtain two or more sets of images. The two or more sets of images may include a first image captured by a first image capture device and a second image captured by a second image capture device. The one or more processors may determine, for a set of images, two or more pairs of points. Each of the two or more pairs of points may include a first point in the first image and a second point in the second image, and the first point and the second point may correspond to a same object. The one or more processors may determine a first rotation matrix based on the pairs of points in the two or more sets of images. The first rotation matrix may be associated with a relationship between positions of the first image capture device and the second image capture device.

According to yet another aspect of the present disclosure, an image capture system may include an image obtaining module configured to obtain two or more sets of images. The two or more sets of images may include a first image captured by a first image capture device and a second image captured by a second image capture device. The system may also include a point determination module configured to determine, for a set of images, two or more pairs of points. Each of the two or more pairs of points may include a first point in the first image and a second point in the second image, and the first point and the second point may correspond to a same object. The system may also include a matrix determination module configured to determine a first rotation matrix based on the pairs of points in the two or more sets of images. The first rotation matrix may be associated with a relationship between positions of the first image capture device and the second image capture device.

According to yet another aspect of the present disclosure, a non-transitory computer readable medium may comprise at least one set of instructions for image capture. The at least one set of instructions may be executed by one or more processors of a computer server. The one or more processors may obtain two or more sets of images. The two or more sets of images may include a first image captured by a first image capture device and a second image captured by a second image capture device. The one or more processors may determine, for a set of images, two or more pairs of points. Each of the two or more pairs of points may include a first point in the first image and a second point in the second image, and the first point and the second point may correspond to a same object. The one or more processors may determine a first rotation matrix based on the pairs of points in the two or more sets of images. The first rotation matrix may be associated with a relationship between positions of the first image capture device and the second image capture device.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for camera calibration according to some embodiments of the present disclosure.

DETAILED DESCRIPTION

Figure 1:
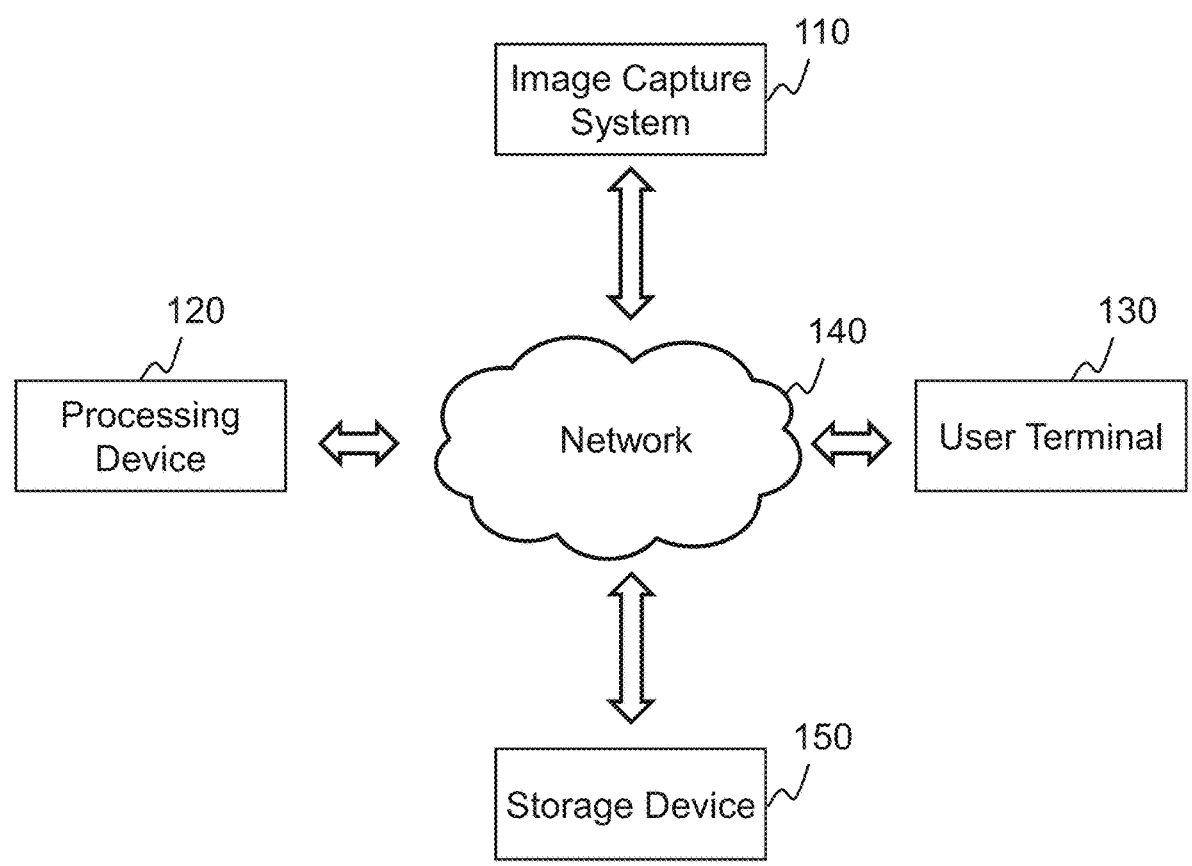
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The disclosure is directed to systems and methods for camera calibration between two cameras. Two or more sets of images may be captured by the two cameras. Two or more pairs of points may be determined in each set of images. A pair of points may correspond to a same object. A rotation matrix indicating a relationship between positions of the two cameras may be determined based on three-dimensional (3D) information of the two or more pairs of points. In the systems and methods for camera calibration in the present disclosure, the PTZ camera may capture an image from a field of view at least partially overlapped with a field of view of the wide-angle camera, instead of by manually moving the PTZ camera to center at a selected point in the image captured by the wide-angle camera. In addition, the process for camera calibration in the present disclosure may be fully automatic, which reduces human effort, and improves the efficiency and the accuracy for camera calibration.

FIG. 1 is a schematic diagram illustrating an exemplary imaging system 100 according to some embodiments of the present disclosure. The imaging system 100 may be a system that uses one or more cameras and computers to simulate a biological vision and to identify, track, locate, and measure an object in the real world through acquiring, processing, and analyzing images. As illustrated in FIG. 1, the imaging system 100 may include an image capture system 110, a processing device 120, one or more user terminals 130, a network 140, and a storage device 150.

The image capture system 110 may be configured to capture images or videos. The images or videos may be two-dimensional (2D) or three-dimensional (3D). In some embodiments, the image capture system 110 may be a binocular vision system or a multi-vision system. The image capture system 110 may include two or more image capture devices configured to capture one or more images or videos. The two or more image capture devices may be mounted separately or be included in a single device, such as a device with two or more cameras.

In some embodiments, the two or more image capture devices may include a digital camera, a static camera, a pan-tilt-zoom (PTZ) camera, a wide-angle camera, a moving camera, a stereoscopic camera, a structured light camera, a time-of-flight camera, a perspective camera, or the like, or any combination thereof. The digital camera may include a 2D camera, a 3D camera, a panoramic camera, a virtual reality (VR) camera, a web camera, an instant picture camera, a video camera, a surveillance camera, or the like, or any combination thereof. In some embodiments, at least one of the two or more image capture devices in the image capture system 110 may be the PTZ camera. For example, the image capture system 110 may include a static wide-angle camera and a PTZ camera. As another example, the image capture system 110 may include two PTZ cameras.

In some embodiments, the image capture system 110 may be added to or be part of a medical imaging equipment, a night-vision equipment, a radar equipment, a sonar equipment, an electronic eye, a camcorder, a thermal imaging equipment, a smartphone, a tablet personal computer (PC), a laptop, a wearable equipment (e.g., 3D glasses), an eye of a robot, a vehicle traveling data recorder, an unmanned device (e.g., a unmanned aerial vehicle (UAV), a driverless car, etc.), a video gaming console, or the like, or any combination thereof.

In some embodiments, the image capture system 110 may communicate with one or more components (e.g., the user terminal 130, the processing device 120, or the storage device 150) of the imaging system 100 via the network 140. In some embodiments, the image capture system 110 may be directly connected to the one or more components (e.g., the user terminal 130, the processing device 120, or the storage device 150) of the imaging system 100.

The user terminal(s) 130 may receive/transmit data and/or information from the image capture system 110, the processing device 120, and/or the storage device 150. For example, the user terminal 130 may receive images and/or videos from the image capture system 110. As another example, the user terminal 130 may transmit instructions to the image capture system 110 and/or the processing device 120.

The user terminal(s) 130 may include a mobile device, a tablet computer, a laptop computer, or the like, or any combination thereof. In some embodiments, the mobile device may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™.

In some embodiments, the user terminal 130 may communicate with one or more components (e.g., the image capture system 110, the processing device 120, or the storage device 150) of the imaging system 100 via the network 140. In some embodiments, the user terminal 130 may be directly connected to the one or more components (e.g., the image capture system 110, the processing device 120, or the storage device 150) of the imaging system 100. In some embodiments, the user terminal 130 may be part of the image capture system 110 and/or the processing device 120.

The processing device 120 may process information and/or data to perform one or more functions described in the present disclosure. For example, the processing device 120 may perform automatic camera calibration between at least two imaging capture devices in the imaging capture system 110.

In some embodiments, the processing device 120 may be a single server or a server group. The server group may be centralized, or distributed (e.g., the processing device 120 may be a distributed system). In some embodiments, the processing device 120 may be local or remote. For example, the processing device 120 may access/transmit information and/or data in/to the image capture system 110, the user terminal 130, or the storage device 150 via the network 140. As another example, the processing device 120 may be directly connected to the image capture system 110, the user terminal 130, or the storage device 150 to access/transmit information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 having one or more components illustrated in FIG. 2 in the present disclosure.

In some embodiments, the processing device 120 may be implemented on a mobile device, a tablet computer, a laptop computer, a built-in device in a motor vehicle, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle may include an onboard computer, an onboard television, a traveling data recorder, etc. In some embodiments, the processing device 120 may be implemented on a mobile device 300 having one or more components illustrated in FIG. 3 in the present disclosure.

In some embodiments, the processing device 120 may include one or more processing engines (e.g., single-core processing engine(s) or multi-core processor(s)). Merely by way of example, the processing device 120 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 120 may be part of the image capture system 110.

The network 140 may be configured to facilitate communications among the components (e.g., the image capture system 110, the user terminal 130, the processing device 120, and the storage device 150) of the imaging system 100. For example, the network 140 may transmit digital signals from the image capture system 110 to the processing device 120. As another example, the network 140 may transmit images generated by the image capture system 110 to the storage device 150.

In some embodiments, the network 140 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The storage device 150 may be configured to store data and/or instructions. In some embodiments, the storage device 150 may store data obtained from the processing device 120 and/or the image capture system 110. For example, the storage device 150 may store images captured by the image capture system 110. In some embodiments, the storage device 150 may store data and/or instructions that the processing device 120 may execute or use to perform exemplary methods described in the present disclosure. For example, the storage device 150 may store instructions that the processing device 120 may execute to perform automatic camera calibration between at least two imaging capture devices in the imaging capture system 110. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components in the imaging system 100 (e.g., the image capture system 110, the user terminal 130, and the processing device 120). One or more components in the imaging system 100 may access the data or instructions stored in the storage device 150 via the network 140. In some embodiments, the storage device 150 may be directly connected to or communicate with one or more components in the imaging system 100 (e.g., the image capture system 110, the user terminal 130, and the processing device 120). In some embodiments, the storage device 150 may be part of the image capture system 110, the user terminal 130, and/or the processing device 120.

In some embodiments, two or more components of the imaging system 100 may be integrated in one device. For example, the image capture system 110, the processing device 120, and the storage device 150 may be integrated in one device (e.g., a camera, a smartphone, a laptop, a workstation, a server, etc.). In some embodiments, one or more components of the imaging system 100 may be located remote from other components. For example, the image capture system 110 may be installed at a location away from the processing device 120, which may be implemented in a single device with the storage device 150.

It should be noted that the component of the imaging system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
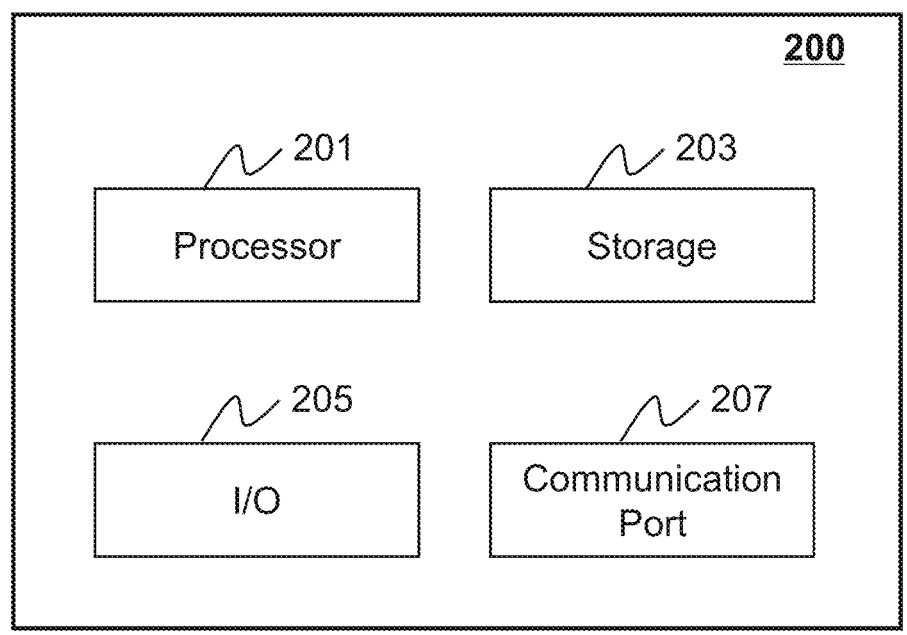
FIG. 2 is a schematic diagram illustrating exemplary hardware and software components of a computing device according to some embodiments of the present disclosure.

FIG. 2 is a schematic diagram illustrating exemplary hardware and/or software components of a computing device on which the processing device 120 and/or the image capture system 110 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 120 may be implemented on the computing device 200 and the processor 201 may perform automatic camera calibration between at least two image capture devices in the image capture system 110. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for camera calibration. As another example, the storage 203 may store images captured by the image capture system 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
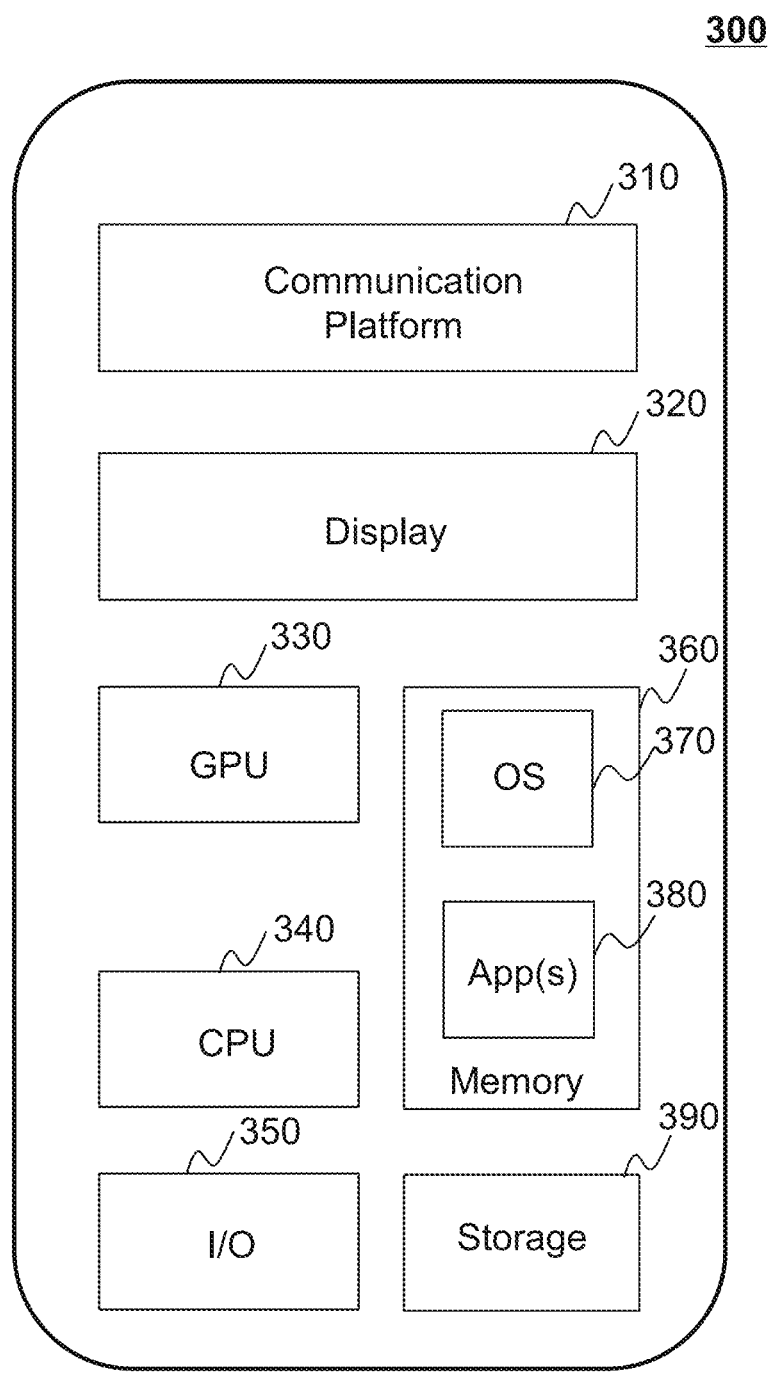
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image capture system 110, the user terminal 130, and/or the processing device 120 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps. User interactions with the information stream may be achieved via the I/O 350 and provided to the processing device 120 and/or other components of the imaging system 100 via the network 140. Merely by way of example, images captured by the image capture system 110 may be displayed in the user terminal 130 through the display 320. As another example, a user may input an instruction for performing camera calibration through the I/O 350 and transmit the instruction to the processing device 120 through the communication platform 310.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

Figure 4:
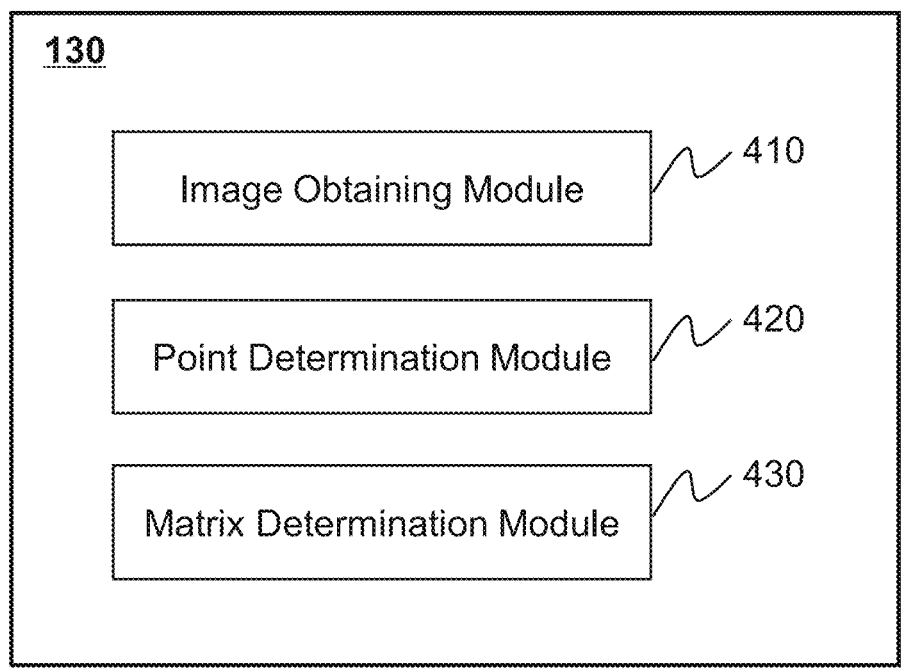
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 120 may include an image obtaining module 410, a point determination module 420, and a matrix determination module 430.

The image obtaining module 410 may be configured to obtain one or more sets of images. Each of the one or more sets of images may include a first image captured by a first image capture device (e.g., a master camera) in the image capture system 110 and a second image captured by a second image capture device (e.g., a slave camera) in the image capture system 110.

In some embodiments, the second image capture device may be a PTZ camera. The first image capture device may have a broad field of view that is greater than an angle threshold (e.g., 30°, 40°, 50°, 60°, 90°, etc.). The first image capture device may be a static camera or a PTZ camera.

In some embodiments, the first image and the second image may be captured simultaneously or substantially simultaneously. For example, the difference between the capture times of the first image and the second image may be reasonably small for an ordinary person in the art, such as not more than 2 s, preferably not more than 1 s, more preferably not more than 0.5 s, still more preferably not more than 0.1 s, particularly preferably not more than 0.05 s, much more preferably not more than 0.01 s, and most preferably not more than 0.001 s. In some embodiments, the first images in the one or more sets of images may be a same image.

In some embodiments, the first image capture device may capture the first image from a first field of view. The second image capture device may capture the second image from a second field of view. There may be overlap between the first field of view and the second field of view.

In some embodiments, in the condition that the image capture system 110 captures two or more sets of image, if the first image capture device is a PTZ camera, the first field of views related to the first images in the two or more sets of images may be same or different. If the first images are captured from the same field of view (e.g., the first image capture device is a static camera, or the first image capture device is a PTZ camera and captures the first images from the same field of view), the second fields of view related to the second images in the two or more sets of images may completely cover the first field of view. The overlap of the second fields of view related to the second images in the two or more sets of images may be as small as possible.

In some embodiments, during the capture of the one or more sets of images, the zoom ratio of the PTZ camera (e.g., the first image capture device and/or the second image capture device) may be any value allowed by the PTZ camera, such as the minimum zoom ratio of the PTZ camera.

In some embodiments, the first image capture device and second image capture device may capture the one or more sets of images after receiving an instruction for capturing the one or more sets of images. The process for generating the instruction for capturing the one or more sets of images may be manual or automatic.

For example, a user may input an instruction for capturing the one or more sets of images through the processing device 120, the user terminal 130, or the image capture system 110 and transmit the instruction to the first image capture device and second image capture device. As another example, the processing device 120, the user terminal 130, and/or the image capture system 110 may monitor the first image capture device and the second image capture device continuously or periodically. When the processing device 120, the user terminal 130, and/or the image capture system 110 detects that the relative position between the first image capture device and the second image capture device is changed, the processing device 120, the user terminal 130, and/or the image capture system 110 may automatically transmit an instruction for capturing the one or more sets of images to the first image capture device and second image capture device. As still another example, the processing device 120, the user terminal 130, and/or the image capture system 110 may automatically and periodically (e.g., once a week, or once a month) transmit an instruction for capturing the one or more sets of images to the first image capture device and second image capture device.

In some embodiments, the capture of the one or more sets of images may be manual or automatic. For example, the camera parameters (e.g., the zoom ratio, the focal length, the pan angle, the tilt angle, etc.) of the first image capture device and second image capture device may be set automatically, and the first image capture device and the second image capture device may capture the one or more sets of images automatically. As another example, the camera parameters of the first image capture device and second image capture device may be set manually. As still another example, the shutters of the first image capture device and second image capture device may be operated manually.

The point determination module 420 may be configured to determine one or more pairs of points for at least one set of images. In some embodiments, each of the one or more pairs of points may correspond to one of the one or more set of images. For example, a pair of points may include a first point in the first image of a set of images and a second point in the second image of the set of images. The first point and the second point may correspond to a same object. In some embodiments, the numbers of the pairs of points in each set of images may be same or different.

In some embodiments, the first points in the first image (and/or the second points in the second image) may distribute sparsely (as shown in FIG. 6). For example, the distance between any two of the first points may be greater than a distance threshold (e.g., 0.5 mm, 1 mm, 2 mm, 1%, 2%, or 5% of the length of the first image, etc.). In some embodiments, the first points in the first image (and/or the second points in the second image) may be non-collinear (as shown in FIG. 6). Further, there may not be three collinear points in the first points in the first image (and/or the second points in the second image). In some embodiments, the one or more pairs of points may correspond to still objects, such as buildings, ground, trunks of trees, parked vehicles, etc.

In some embodiments, the one or more pairs of points may be determined manually. In some embodiments, the point determination module 420 may determine the one or more pairs of points automatically. For example, the point determination module 420 may automatically identify one or more still objects in the first image(s) and/or the second image(s) using any existing identification algorithm, such as, a feature-based identification algorithm, an identification algorithm based on neural network, an identification algorithm based on support vector machine (SVM), or the like, or any combination thereof. As another example, the point determination module 420 may automatically determine the one or more pairs of points using any existing matching algorithm, such as, a speeded up robust feature (SURF) algorithm, a scale invariant feature transform (SIFT) algorithm, an oriented brief (ORB) algorithm, a features from accelerated segment test (FAST) algorithm, a Harris corner algorithm, or the like, or any combination thereof.

In some embodiments, the one or more pairs of points may be determined manually and automatically. For example, the point determination module 420 may first automatically determine the one or more pairs of points. If the automatic determination of the one or more pairs of points is failed, a user of the imaging system 100 may manually determine the one or more pairs of points. As another example, the point determination module 420 may first automatically determine the one or more pairs of points. Then the one or more pairs of points may be modified (e.g., correct at least one point, delete at least one point, or add one or more new points) manually.

The matrix determination module 430 may be configured to determine a first rotation matrix based on the one or more pairs of points in the one or more sets of images. The first rotation matrix may indicate a relationship between positions of the first image capture device and the second image capture device. For example, the first rotation matrix may indicate a relationship between the camera coordinate system of the first image capture device and the camera coordinate system of the second image capture device.

In some embodiments, the first rotation matrix may be an orthogonal matrix. In some embodiments, the numbers of the rows and the columns of the first rotation matrix may be any value. For example, the first rotation matrix may be a 3×3 or 4×4 matrix. In some embodiments, the first rotation matrix may be represented in any manner, such as quaternions, Eulerian angles, PT parameters, a Rodrigues matrix, figures, etc.

In some embodiments, the first rotation matrix may relate to extrinsic parameters of the PTZ camera (e.g., the first image capture device and/or the second image capture device) in the image capture system 110. The extrinsic parameter may be a pose and/or a position parameter of the PTZ camera including, for example, a pitch angle, a roll angle, a yaw angle, a height and/or a 3D coordinate of the origin of the PTZ camera coordinate system in the world coordinate system, or a combination thereof. As used herein, the world coordinate system may be a 3D coordinate system constructed according to the real world, and the origin of the world coordinate system may be a point in the real world. The first coordinate axis and the second coordinate axis of the world coordinate system may be parallel to a horizontal plane and perpendicular to each other. The third coordinate axis of the world coordinate system may be perpendicular to the horizontal plane. The origin of the PTZ camera coordinate system may be an optical center of the PTZ camera. The first coordinate axis of the PTZ camera coordinate system may be an optical axis of the PTZ camera. The second coordinate axis and the third coordinate axis of the PTZ camera coordinate system may be parallel to the imaging plane of the PTZ camera and perpendicular to each other (e.g., the second coordinate axis and the third coordinate axis of the PTZ camera coordinate system may be parallel to the sides of the imaging plane of the PTZ camera, respectively). The pitch angle, the yaw angle, and the roll angle refer to rotation angles of the first, second, and third coordinate axes of the world coordinate system, respectively, to form the PTZ camera coordinate system.

In some embodiments, the matrix determination module 430 may determine 2D coordinates for each first point in a first image coordinate system (or a first pixel coordinate system) of the first image and 2D coordinates for each second point in a second image coordinate system (or a second pixel coordinate system) of the second image. In the image coordinate system (e.g., the first or second image coordinate system) (or the pixel coordinate system) of an image (e.g., the first or second image), the origin may be a pixel in the image (e.g., a pixel in the highest position in the top left corner of the image, or a center pixel in the image). The horizontal coordinate axis of the image coordinate system (or the pixel coordinate system) may be a horizontal direction of the image. The vertical coordinate axis of the image coordinate system (or the pixel coordinate system) may be a vertical direction of the image.

In some embodiments, the matrix determination module 430 may determine 3D information of the one or more pairs of points based on the 2D coordinates of the one or more pairs of points and/or intrinsic parameters of the first image capture device and/or the second image capture device. The intrinsic parameter may include a focal length, a central point, a lens distortion parameter, or the like, or a combination thereof.

For example, first 3D information related to first points in the first image may include 3D coordinates of the first points or vectors from an optical center of the first image capture device to the first points, and second 3D information related to second points may include 3D coordinates of the second points or vectors from an optical center of the second image capture device to the second points.

In some embodiments, the matrix determination module 430 may determine the first rotation matrix based on the first 3D information and the second 3D information. For example, the matrix determination module 430 may determine third 3D information of the first points based on the second 3D information of the second points and a preliminary rotation matrix. The matrix determination module 430 may compare the first 3D information with the third 3D information. If the difference between the first 3D information and the third 3D information is less than a difference threshold, the matrix determination module 430 may determine the preliminary rotation matrix as the first rotation matrix. If the difference between the first 3D information and the third 3D information is greater than or equal to the difference threshold, the matrix determination module 430 may use another preliminary rotation matrix, until the first 3D information and the third 3D information is less than the difference threshold.

Merely by way of example, if the first image capture devices is a static perspective cameras, and the second image capture device is a PTZ perspective camera, the matrix determination module 430 may determine the 3D information of a first point in the first image based on Equation (1) below:

$$x(\beta) = \begin{bmatrix} x \\ y \\ f \end{bmatrix} / \sqrt{x^2 + y^2 + f^2}, \quad (1)$$

wherein $x(\beta)$ refers to the vector from the optical center of the first image capture device to the first point, $\beta$ refers to the intrinsic parameters of the first image capture device and/or the second image capture device, x and y refer to the 2D coordinates of the first point in the first image coordinate system, and f refers to the focal length of the first image capture device. The matrix determination module 430 may determine the second 3D information based on an operation similar to the first 3D information.

When the second image capture device captures the second images, the PT parameters may be recorded and stored in a storage medium (e.g., the storage device 150, the storage 203, the storage 390, or the memory 360) of the imaging system 100. The matrix determination module 430 may obtain the PT parameters for each second image from the storage medium. The matrix determination module 430 may determine a second rotation matrix based on the PT parameters of the second image capture device. The second rotation matrix may indicate a relationship between the position of the second image capture device and the world coordinate system. For example, the second rotation matrix may indicate a relationship between the world coordinate system and the camera coordinate system of the second image capture device. As another example, the second rotation matrix may indicate a relationship between the world coordinate system and the image coordinate system (or the pixel coordinate system) of the second image capture device. The matrix determination module 430 may determine the second rotation matrix based on the PT parameters using any existing techniques for single camera calibration.

The matrix determination module 430 may determine the first rotation matrix based on the first 3D information, the second 3D information, and the second rotation matrix using Equation (2) below:

$$\min_{\theta,\beta} J(\theta, \beta) = \sum_{k}^{K} \sum_{i}^{N_k} \|x_i(\beta) - R_k R(\theta) v_i(\beta)\|^2, \quad (2)$$

wherein $\theta$ refers to the extrinsic parameters of the first image capture device and/or the second image capture device, $x_i(\beta)$ refers to the vector from the optical center of the first image capture device to the first point of the $i^{th}$ pair of points, $v_i(\beta)$ refers to the vector from the optical center of the second image capture device to the second point of the $i^{th}$ (1=1, 2, 3, . . . , $N_k$, $N_k$ is an integer and greater than or equal to 1) pair of points, $N_k$ refers to the number of the pairs of points in each set of images, $R_k$ refers to the second rotation matrix corresponding to the $k^{th}$ (k=1, K, K is an integer and greater than or equal to 1) second image in the one or more sets of image, K refers to the number of the sets of images, $\| \|$ refers to an operation of norm, and $R(\theta)$ refers to the first rotation matrix.

The matrix determination module 430 may solve Equation (2) using any existing techniques for optimization, such as a levenberg-marquardt (LM) algorithm.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may further include a storage module (not shown in FIG. 4). The storage module may be configured to store data generated during any process performed by any component of in the processing device 120. As another example, each of components of the processing device 120 may correspond to a storage module, respectively. Additionally or alternatively, the components of the processing device 120 may share a common storage module.

FIG. 5 is a flowchart illustrating an exemplary process for camera calibration according to some embodiments of the present disclosure. In some embodiments, the process 500 may be implemented in the imaging system 100 illustrated in FIG. 1. For example, the process 500 may be stored in a storage medium (e.g., the storage device 150, the storage 220, the memory 360, or the storage 390) as a form of instructions, and can be invoked and/or executed by the processing device 120 (e.g., the processor 210, the CPU 340, or one or more modules in the processing device 120 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

For brevity, the description of the methods and/or systems for camera calibration may take the image capture system 110 including two image capture devices as an example. It should be noted that the methods and/or systems for camera calibration described below are merely some examples or implementations. For persons having ordinary skills in the art, the methods and/or systems for camera calibration in the present disclosure may be applied to other similar situations, such as the image capture system 110 including more than two image capture devices.

For brevity, the description of the methods and/or systems for camera calibration may take the determination of a rotation matrix between two cameras as an example. It should be noted that the methods and/or systems for camera calibration described below are merely some examples or implementations. For persons having ordinary skills in the art, the methods and/or systems for camera calibration in the present disclosure may be applied to other similar situations, such as the determination of a translation matrix, or a transformation matrix including a rotation matrix and a translation matrix between two cameras.

In 510, the processing device 120 (e.g., the image obtaining module 410) may obtain one or more sets of images. Each of the one or more sets of images may include a first image captured by a first image capture device (e.g., a master camera) in the image capture system 110 and a second image captured by a second image capture device (e.g., a slave camera) in the image capture system 110.

In some embodiments, the second image capture device may be a PTZ camera. The first image capture device may have a broad field of view that is greater than an angle threshold (e.g., 30°, 40°, 50°, 60°, 90°, etc.). The first image capture device may be a static camera or a PTZ camera.

In some embodiments, the first image and the second image may be captured simultaneously or substantially simultaneously. For example, the difference between the capture times of the first image and the second image may be reasonably small for an ordinary person in the art, such as not more than 2 s, preferably not more than 1 s, more preferably not more than 0.5 s, still more preferably not more than 0.1 s, particularly preferably not more than 0.05 s, much more preferably not more than 0.01 s, and most preferably not more than 0.001 s. In some embodiments, the first images in the one or more sets of images may be a same image.

In some embodiments, the first image capture device may capture the first image from a first field of view. The second image capture device may capture the second image from a second field of view. There may be overlap between the first field of view and the second field of view.

In some embodiments, in the condition that the image capture system 110 captures two or more sets of image, if the first image capture device is a PTZ camera, the first field of views related to the first images in the two or more sets of images may be same or different. If the first images are captured from the same field of view (e.g., the first image capture device is a static camera, or the first image capture device is a PTZ camera and captures the first images from the same field of view), the second fields of view related to the second images in the two or more sets of images may completely cover the first field of view. The overlap of the second fields of view related to the second images in the two or more sets of images may be as small as possible.

In some embodiments, during the capture of the one or more sets of images, the zoom ratio of the PTZ camera (e.g., the first image capture device and/or the second image capture device) may be any value allowed by the PTZ camera, such as the minimum zoom ratio of the PTZ camera.

In some embodiments, the first image capture device and second image capture device may capture the one or more sets of images after receiving an instruction for capturing the one or more sets of images. The process for generating the instruction for capturing the one or more sets of images may be manual or automatic.

For example, a user may input an instruction for capturing the one or more sets of images through the processing device 120, the user terminal 130, or the image capture system 110 and transmit the instruction to the first image capture device and second image capture device. As another example, the processing device 120, the user terminal 130, and/or the image capture system 110 may monitor the first image capture device and the second image capture device continuously or periodically. When the processing device 120, the user terminal 130, and/or the image capture system 110 detects that the relative position between the first image capture device and the second image capture device is changed, the processing device 120, the user terminal 130, and/or the image capture system 110 may automatically transmit an instruction for capturing the one or more sets of images to the first image capture device and second image capture device. As still another example, the processing device 120, the user terminal 130, and/or the image capture system 110 may automatically and periodically (e.g., once a week, or once a month) transmit an instruction for capturing the one or more sets of images to the first image capture device and second image capture device.

In some embodiments, the capture of the one or more sets of images may be manual or automatic. For example, the camera parameters (e.g., the zoom ratio, the focal length, the pan angle, the tilt angle, etc.) of the first image capture device and second image capture device may be set automatically, and the first image capture device and the second image capture device may capture the one or more sets of images automatically. As another example, the camera parameters of the first image capture device and second image capture device may be set manually. As still another example, the shutters of the first image capture device and second image capture device may be operated manually.

In 520, the processing device 120 (e.g., the point determination module 420) may determine one or more pairs of points for at least one set of images. In some embodiments, each of the one or more pairs of points may correspond to one of the one or more set of images. For example, a pair of points may include a first point in the first image of a set of images and a second point in the second image of the set of images. The first point and the second point may correspond to a same object. In some embodiments, the numbers of the pairs of points in each set of images may be same or different.

In some embodiments, the first points in the first image (and/or the second points in the second image) may distribute sparsely (as shown in FIG. 6). For example, the distance between any two of the first points may be greater than a distance threshold (e.g., 0.5 mm, 1 mm, 2 mm, 1%, 2%, or 5% of the length of the first image, etc.). In some embodiments, the first points in the first image (and/or the second points in the second image) may be non-collinear (as shown in FIG. 6). Further, there may not be three collinear points in the first points in the first image (and/or the second points in the second image). In some embodiments, the one or more pairs of points may correspond to still objects, such as buildings, ground, trunks of trees, parked vehicles, etc.

In some embodiments, the one or more pairs of points may be determined manually. In some embodiments, the processing device 120 may determine the one or more pairs of points automatically. For example, the processing device 120 may automatically identify one or more still objects in the first image(s) and/or the second image(s) using any existing identification algorithm, such as, a feature-based identification algorithm, an identification algorithm based on neural network, an identification algorithm based on support vector machine (SVM), or the like, or any combination thereof. As another example, the processing device 120 may automatically determine the one or more pairs of points using any existing matching algorithm, such as, a speeded up robust feature (SURF) algorithm, a scale invariant feature transform (SIFT) algorithm, an oriented brief (ORB) algorithm, a features from accelerated segment test (FAST) algorithm, a Harris corner algorithm, or the like, or any combination thereof.

In some embodiments, the one or more pairs of points may be determined manually and automatically. For example, the processing device 120 may first automatically determine the one or more pairs of points. If the automatic determination of the one or more pairs of points is failed, a user of the imaging system 100 may manually determine the one or more pairs of points. As another example, the processing device 120 may first automatically determine the one or more pairs of points. Then the one or more pairs of points may be modified (e.g., correct at least one point, delete at least one point, or add one or more new points) manually.

In 530, the processing device 120 (e.g., the matrix determination module 430) may determine a first rotation matrix based on the one or more pairs of points in the one or more sets of images. The first rotation matrix may indicate a relationship between positions of the first image capture device and the second image capture device. For example, the first rotation matrix may indicate a relationship between the camera coordinate system of the first image capture device and the camera coordinate system of the second image capture device.

In some embodiments, the first rotation matrix may be an orthogonal matrix. In some embodiments, the numbers of the rows and the columns of the first rotation matrix may be any value. For example, the first rotation matrix may be a 3×3 or 4×4 matrix. In some embodiments, the first rotation matrix may be represented in any manner, such as quaternions, Eulerian angles, PT parameters, a Rodrigues matrix, figures, etc.

In some embodiments, the first rotation matrix may relate to extrinsic parameters of the PTZ camera (e.g., the first image capture device and/or the second image capture device) in the image capture system 110. The extrinsic parameter may be a pose and/or a position parameter of the PTZ camera including, for example, a pitch angle, a roll angle, a yaw angle, a height and/or a 3D coordinate of the origin of the PTZ camera coordinate system in the world coordinate system, or a combination thereof. As used herein, the world coordinate system may be a 3D coordinate system constructed according to the real world, and the origin of the world coordinate system may be a point in the real world. The first coordinate axis and the second coordinate axis of the world coordinate system may be parallel to a horizontal plane and perpendicular to each other. The third coordinate axis of the world coordinate system may be perpendicular to the horizontal plane. The origin of the PTZ camera coordinate system may be an optical center of the PTZ camera. The first coordinate axis of the PTZ camera coordinate system may be an optical axis of the PTZ camera. The second coordinate axis and the third coordinate axis of the PTZ camera coordinate system may be parallel to the imaging plane of the PTZ camera and perpendicular to each other (e.g., the second coordinate axis and the third coordinate axis of the PTZ camera coordinate system may be parallel to the sides of the imaging plane of the PTZ camera, respectively). The pitch angle, the yaw angle, and the roll angle refer to rotation angles of the first, second, and third coordinate axes of the world coordinate system, respectively, to form the PTZ camera coordinate system.

In some embodiments, the processing device 120 may determine 2D coordinates for each first point in a first image coordinate system (or a first pixel coordinate system) of the first image and 2D coordinates for each second point in a second image coordinate system (or a second pixel coordinate system) of the second image. In the image coordinate system (e.g., the first or second image coordinate system) (or the pixel coordinate system) of an image (e.g., the first or second image), the origin may be a pixel in the image (e.g., a pixel in the highest position in the top left corner of the image, or a center pixel in the image). The horizontal coordinate axis of the image coordinate system (or the pixel coordinate system) may be a horizontal direction of the image. The vertical coordinate axis of the image coordinate system (or the pixel coordinate system) may be a vertical direction of the image.

In some embodiments, the processing device 120 may determine 3D information of the one or more pairs of points based on the 2D coordinates of the one or more pairs of points and/or intrinsic parameters of the first image capture device and/or the second image capture device. The intrinsic parameter may include a focal length, a central point, a lens distortion parameter, or the like, or a combination thereof.

For example, first 3D information related to first points in the first image may include 3D coordinates of the first points or vectors from an optical center of the first image capture device to the first points, and second 3D information related to second points may include 3D coordinates of the second points or vectors from an optical center of the second image capture device to the second points.

In some embodiments, the processing device 120 may determine the first rotation matrix based on the first 3D information and the second 3D information. For example, the processing device 120 may determine third 3D information of the first points based on the second 3D information of the second points and a preliminary rotation matrix. The processing device 120 may compare the first 3D information with the third 3D information. If the difference between the first 3D information and the third 3D information is less than a difference threshold, the processing device 120 may determine the preliminary rotation matrix as the first rotation matrix. If the difference between the first 3D information and the third 3D information is greater than or equal to the difference threshold, the processing device 120 may use another preliminary rotation matrix, until the first 3D information and the third 3D information is less than the difference threshold.

Merely by way of example, if the first image capture devices is a static perspective cameras, and the second image capture device is a PTZ perspective camera, the processing device 120 may determine the 3D information of a first point in the first image based on Equation (1) below:

$$x(\beta) = \begin{bmatrix} x \\ y \\ f \end{bmatrix} / \sqrt{x^2 + y^2 + f^2}, \quad (1)$$

wherein $x(\beta)$ refers to the vector from the optical center of the first image capture device to the first point, refers to the intrinsic parameters of the first image capture device and/or the second image capture device, x and y refer to the 2D coordinates of the first point in the first image coordinate system, and f refers to the focal length of the first image capture device. The processing device 120 may determine the second 3D information based on an operation similar to the first 3D information.

When the second image capture device captures the second images, the PT parameters may be recorded and stored in a storage medium (e.g., the storage device 150, the storage 203, the storage 390, or the memory 360) of the imaging system 100. The processing device 120 may obtain the PT parameters for each second image from the storage medium. The processing device 120 may determine a second rotation matrix based on the PT parameters of the second image capture device. The second rotation matrix may indicate a relationship between the position of the second image capture device and the world coordinate system. For example, the second rotation matrix may indicate a relationship between the world coordinate system and the camera coordinate system of the second image capture device. As another example, the second rotation matrix may indicate a relationship between the world coordinate system and the image coordinate system (or the pixel coordinate system) of the second image capture device. The processing device 120 may determine the second rotation matrix based on the PT parameters using any existing techniques for single camera calibration.

The processing device 120 may determine the first rotation matrix based on the first 3D information, the second 3D information, and the second rotation matrix using Equation (2) below:

$$\min_{\theta,\beta} J(\theta, \beta) = \sum_{k}^{K} \sum_{i}^{N_k} \|x_i(\beta) - R_k R(\theta) v_i(\beta)\|^2, \quad (2)$$

wherein $\theta$ refers to the extrinsic parameters of the first image capture device and/or the second image capture device, $x_i(\beta)$ refers to the vector from the optical center of the first image capture device to the first point of the $i^{th}$ pair of points, $v_i(\beta)$ refers to the vector from the optical center of the second image capture device to the second point of the $i^{th}$ (i=1, 2, 3, ..., $N_k$, $N_k$ is an integer and greater than or equal to 1) pair of points, $N_k$ refers to the number of the pairs of points in each set of images, $R_k$ refers to the second rotation matrix corresponding to the $k^{th}$ (k=1, 2, 3, ..., K, K is an integer and greater than or equal to 1) second image in the one or more sets of image, K refers to the number of the sets of images, $\| \|$ refers to an operation of norm, and $R(\theta)$ refers to the first rotation matrix.

The processing device 120 may solve Equation (2) using any existing techniques for optimization, such as a levenberg-marquardt (LM) algorithm.

In some embodiments, the process for determining the first rotation matrix in operation 530 may be automatic.

In some embodiments, when the imaging system 100 tracks a target, the first image capture device may first capture an image including the target. Then an area including the target in the image may be determined manually or automatically. The processing device 120 may determine first 3D coordinates of the center point of the area in the camera coordinate system of the first image capture device. The processing device may determine second 3D coordinates of the center point of the area in the camera coordinate system of the second image capture device using the first rotation matrix. The processing device 120 may determine PT parameters of the second image capture device used to make the field of view of the second image capture device centered at the center point of the area. The processing device 120 may adjust the position of the second image capture device based on the determined PT parameters so that the field of view of the second image capture device is centered at the center point of the area, which achieves the link between the first image capture device and the second image capture device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figures 6A, 6B:
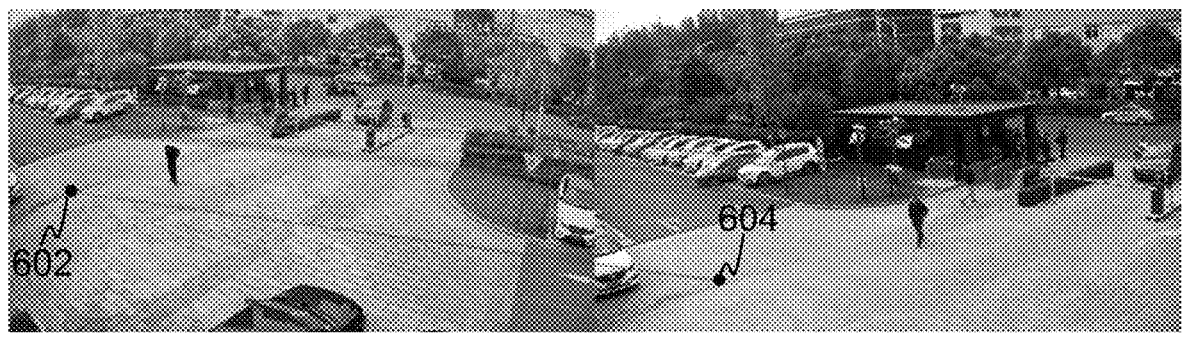
FIGS. 6A and 6B are schematic diagrams illustrating exemplary pairs of points in a set of image according to some embodiments of the present disclosure.

FIGS. 6A and 6B are schematic diagrams illustrating exemplary pairs of points in a set of image according to some embodiments of the present disclosure. As shown in FIGS. 6A and 6B, FIG. 6A refers to the first image captured by the first image capture device from the first field of view, and FIG. 6B refers to the second image captured by the second image capture device from the second field of view. There is overlap between the first field of view and the second field of view. In FIGS. 6A and 6B, two points connected with a straight line refer to a pair of points, such as points 602 and 604.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An image capture system, comprising:
at least one storage device including a set of instructions;
at least one processor in communication with the at least one storage device, wherein when executing the set of instructions, the at least one processor is directed to cause the system to:
obtain two or more sets of images, wherein the two or more sets of images includes a first image captured by a first image capture device and a second image captured by a second image capture device;
for a set of images, determine two or more pairs of points, wherein each pair of points of the two or more pairs of points includes a first point in the first image and a second point in the second image, and the first point and the second point correspond to a same object;
for the each pair of points,
determine first three-dimensional (3D) information related to the first point based on a first 3D coordinate system associated with the first image capture device;
determine second 3D information related to the second point based on a second 3D coordinate system associated with the second image capture device; and
determine a first rotation matrix based on the first 3D information and the second 3D information of the two or more pairs of points in the two or more sets of images, the first rotation matrix indicating a relationship between a camera coordinate system of the first image capture device and a camera coordinate system of the second image capture device, wherein to determine the first rotation matrix based on the first 3D information and the second 3D information, the at least one processor is further directed to cause the system to:
for each second image in the two or more sets of images,
obtain a pan parameter and a tilt parameter of the second image capture device that are used to capture the second image; and
determine a second rotation matrix based on the pan parameter and the tilt parameter, wherein the second rotation matrix is associated with a relationship between the second 3D coordinate system associated with the second image capture device and a world coordinate system; and determine the first rotation matrix based on the second rotation matrix related to the each second image, the first 3D information, and the second 3D information.

2. The system of claim 1, wherein the first image is captured from a first field of view of the first image capture device, the second image is captured from a second field of view of the second image capture device, and there is overlap between the first field of view and the second field of view.

3. The system of claim 2, wherein the second fields of view related to the second images in the two or more sets of images completely cover the first field of view.

4. The system of claim 1, wherein the first image capture device has a broad field of view that is greater than a threshold, and the second image capture device is a pan-tilt-zoom (PTZ) camera.

5. The system of claim 1, wherein the first 3D information related to the first point includes 3D coordinates of the first point or a vector from an optical center of the first image capture device to the first point, and the second 3D information related to the second point includes 3D coordinates of the second point or a vector from an optical center of the second image capture device to the second point.

6. The system of claim 1, wherein the first rotation matrix is determined using a Levenberg-Marquardt (LM) algorithm.

7. An image capture method implemented on a computing device having one or more processors and one or more storage devices, the method comprising:
obtaining two or more sets of images, wherein the two or more sets of images includes a first image captured by a first image capture device and a second image captured by a second image capture device;
for a set of images, determining two or more pairs of points, wherein each pair of points of the two or more pairs of points includes a first point in the first image and a second point in the second image, and the first point and the second point correspond to a same object;
for the each pair of points,
determining first three-dimensional (3D) information related to the first point based on a first 3D coordinate system associated with the first image capture device;
determining second 3D information related to the second point based on a second 3D coordinate system associated with the second image capture device; and
determining a first rotation matrix based on the first 3D information and the second 3D information of the two or more pairs of points in the two or more sets of images, the first rotation matrix indicating a relationship between a camera coordinate system of the first image capture device and a camera coordinate system of the second image capture device, wherein the determining of the first rotation matrix based on the first 3D information and the second 3D information includes:
for each second image in the two or more sets of images,
obtaining a pan parameter and a tilt parameter of the second image capture device that are used to capture the second image; and
determining a second rotation matrix based on the pan parameter and the tilt parameter, wherein the second rotation matrix is associated with a relationship between the second 3D coordinate system associated with the second image capture device and a world coordinate system; and
determining the first rotation matrix based on the second rotation matrix related to the each second image, the first 3D information, and the second 3D information.

8. The method of claim 7, wherein the first image is captured from a first field of view of the first image capture device, the second image is captured from a second field of view of the second image capture device, and there is overlap between the first field of view and the second field of view.

9. The method of claim 8, wherein the second fields of view related to the second images in the two or more sets of images completely cover the first field of view.

10. The method of claim 7, wherein the first image capture device has a broad field of view that is greater than a threshold, and the second image capture device is a pan-tilt-zoom (PTZ) camera.

11. The method of claim 7, wherein the first 3D information related to the first point includes 3D coordinates of the first point or a vector from an optical center of the first image capture device to the first point, and the second 3D information related to the second point includes 3D coordinates of the second point or a vector from an optical center of the second image capture device to the second point.

12. The method of claim 7, wherein the first rotation matrix is determined using a Levenberg-Marquardt (LM) algorithm.

13. A non-transitory computer readable medium, comprising at least one set of instructions for image capture, wherein when executed by one or more processors of a computing device, the at least one set of instructions causes the computing device to perform a method, the method comprising:
obtaining two or more sets of images, wherein the two or more sets of images includes a first image captured by a first image capture device and a second image captured by a second image capture device;
for a set of images, determining two or more pairs of points, wherein each pair of points of the two or more pairs of points includes a first point in the first image and a second point in the second image, and the first point and the second point correspond to a same object;
for the each pair of points,
determining first three-dimensional (3D) information related to the first point based on a first 3D coordinate system associated with the first image capture device;
determining second 3D information related to the second point based on a second 3D coordinate system associated with the second image capture device; and
determining a first rotation matrix based on the first 3D information and the second 3D information of the two or more pairs of points in the two or more sets of images, the first rotation matrix indicating a relationship between a camera coordinate system of the first image capture device and a camera coordinate system of the second image capture device, wherein the determining of the first rotation matrix based on the first 3D information and the second 3D information includes:
for each second image in the two or more sets of images,
obtaining a pan parameter and a tilt parameter of the second image capture device that are used to capture the second image; and
determining a second rotation matrix based on the pan parameter and the tilt parameter, wherein the second rotation matrix is associated with a relationship between the second 3D coordinate system associated with the second image capture device and a world coordinate system; and
determining the first rotation matrix based on the second rotation matrix related to the each second image, the first 3D information, and the second 3D information.

14. The non-transitory computer readable medium of claim 13, wherein the first image is captured from a first field of view of the first image capture device, the second image is captured from a second field of view of the second image capture device, and there is overlap between the first field of view and the second field of view.

15. The non-transitory computer readable medium of claim 14, wherein the second fields of view related to the second images in the two or more sets of images completely cover the first field of view.

16. The non-transitory computer readable medium of claim 13, wherein the first image capture device has a broad field of view that is greater than a threshold, and the second image capture device is a pan-tilt-zoom (PTZ) camera.

17. The non-transitory computer readable medium of claim 13, wherein the first 3D information related to the first point includes 3D coordinates of the first point or a vector from an optical center of the first image capture device to the first point, and the second 3D information related to the second point includes 3D coordinates of the second point or a vector from an optical center of the second image capture device to the second point.

18. The non-transitory computer readable medium of claim 13, wherein the first rotation matrix is determined using a Levenberg-Marquardt (LM) algorithm.

* * * * *